United States Patent
Bauchot

(10) Patent No.: US 9,875,227 B2
(45) Date of Patent: *Jan. 23, 2018

(54) MANIPULATING OF LABELLED DATA FOR DATA ENTRY IN MANAGEMENT APPLICATIONS

(71) Applicant: International Business Machines Corporation, Armonk, NY (US)

(72) Inventor: Frederic Bauchot, Saint-Jeannet (FR)

(73) Assignee: International Business Machines Corporation, Armonk, NY (US)

(*) Notice: Subject to any disclaimer, the term of this patent is extended or adjusted under 35 U.S.C. 154(b) by 939 days.

This patent is subject to a terminal disclaimer.

(21) Appl. No.: 14/253,934

(22) Filed: Apr. 16, 2014

(65) Prior Publication Data

US 2014/0289600 A1   Sep. 25, 2014

Related U.S. Application Data

(63) Continuation of application No. 10/803,660, filed on Mar. 18, 2004, now Pat. No. 8,782,508.

(30) Foreign Application Priority Data

Apr. 18, 2003 (EP) .................... 03368034

(51) Int. Cl.
  *G06F 17/21* (2006.01)
  *G06F 17/24* (2006.01)

(52) U.S. Cl.
  CPC .......... *G06F 17/246* (2013.01); *G06F 17/245* (2013.01)

(58) Field of Classification Search
  CPC ........ G06F 17/246; G06F 17/21; G06F 17/22; G06F 17/243; G06F 17/30592; G06F 17/30952; G06F 17/245
  See application file for complete search history.

(56) References Cited

U.S. PATENT DOCUMENTS 5,317,686 A  5/1994 Salas et al.
5,414,809 A  5/1995 Hogan et al.
(Continued)

OTHER PUBLICATIONS

MathCard Users Guide, Aug. 1999, MathWorks, pp. 140-141, http://nti.educa.rcanaria.es/matematicas/analisis/MathCad/manmathcad2.pdf, 2 pages.
Preliminary Amendment (dated Mar. 18, 2004) for U.S. Appl. No. 10/803,660, filed Mar. 18, 2004, Conf. No. 6005.
Preliminary Amendment (dated Aug. 4, 2004) for U.S. Appl. No. 10/803,660, filed Mar. 18, 2004, Conf. No. 6005.
Office Action (dated Apr. 21, 2006) for U.S. Appl. No. 10/803,660, filed Mar. 18, 2004, Conf. No. 6005.
Response (filed Jul. 14, 2006) for U.S. Appl. No. 10/803,660, filed Mar. 18, 2004, Conf. No. 6005.
(Continued)

*Primary Examiner* — Wilson Tsui
(74) *Attorney, Agent, or Firm* — Schmeiser, Olsen & Watts, LLP; Isaac Gooshaw

(57) ABSTRACT

A method and system for entry of data into content of cells belonging to an output field. Entered into cells of a multi-dimensional table located within a header record in the table are: input field labels respectively corresponding to input fields in the table entered into a respective unique cell within the header record; and an output label corresponding to the output field entered into a specifically unique cell within the header record and expressed as a mathematical expression of input field labels. The mathematical expressions are translated into the cell address of the cell containing each input field label and then pasted in each cell of the output field. The cell address of the cell containing each input field label is replaced in the pasted mathematical expression by the corresponding cell address of each input field in the same record that contains each cell of the output field.

20 Claims, 10 Drawing Sheets

(56) References Cited

U.S. PATENT DOCUMENTS

| | | | |
|---|---|---|---|
| 5,416,895 A | 5/1995 | Anderson et al. | |
| 5,987,481 A | 11/1999 | Michelman et al. | |
| 6,057,837 A | 5/2000 | Hatakeda et al. | |
| 6,317,758 B1 * | 11/2001 | Madsen | G06F 17/246 715/220 |
| 6,327,592 B1 * | 12/2001 | Yoshikawa | G06F 17/246 |
| 6,625,499 B2 | 9/2003 | Abdalla | |
| 7,010,779 B2 | 3/2006 | Rubin et al. | |
| 8,112,701 B2 | 2/2012 | Gur et al. | |
| 8,782,508 B2 | 7/2014 | Bauchot | |
| 2002/0140699 A1 * | 10/2002 | Miyadai | G06F 17/246 345/440 |
| 2002/0140734 A1 * | 10/2002 | Bennett | G06F 17/246 715/764 |
| 2003/0120999 A1 | 6/2003 | Miller et al. | |
| 2003/0212804 A1 | 11/2003 | Hashemi | |
| 2004/0205524 A1 | 10/2004 | Richter et al. | |
| 2004/0237029 A1 * | 11/2004 | Medicke | G06F 17/246 715/213 |

OTHER PUBLICATIONS

Final Office Action (dated Sep. 26, 2006) for U.S. Appl. No. 10/803,660, filed Mar. 18, 2004, Conf. No. 6005.
Notice of Appeal (filed Dec. 22, 2006) for U.S. Appl. No. 10/803,660, filed Mar. 18, 2004, Conf. No. 6005.
Appeal Brief (filed Feb. 22, 2007) for U.S. Appl. No. 10/803,660, filed Mar. 18, 2004, Conf. No. 6005.
Examiner's Answer (dated Jul. 18, 2007) for U.S. Appl. No. 10/803,660, filed Mar. 18, 2004, Conf. No. 6005.
Reply Brief (filed Sep. 18, 2007) for U.S. Appl. No. 10/803,660, filed Mar. 18, 2004, Conf. No. 6005.
RCE (filed May 17, 2012) for U.S. Appl. No. 10/803,660, filed Mar. 18, 2004, Conf. No. 6005.
Office Action (dated Aug. 1, 2013) for U.S. Appl. No. 10/803,660, filed Mar. 18, 2004, Conf. No. 6005.
Response (filed Oct. 25, 2013) for U.S. Appl. No. 10/803,660, filed Mar. 18, 2004, Conf. No. 6005.
Notice of Allowance (dated Jan. 17, 2014) for U.S. Appl. No. 10/803,660, filed Mar. 18, 2004, Conf. No. 6005.

* cited by examiner

▼ Using existing row and column labels as names

When you create a formula that refers to data in a worksheet, you can use the column and row labels in the worksheet to refer to the data. For example, to calculate the total value for the Product column, use the formula =SUM(Product).

|  | Product |  |
|---|---|---|
|  | 30 |  |
|  | 40 |  |
|  | =SUM(Product) |  |

Using a label

FIG. 3A

How does 1-2-3 know what data to sum?
When you enter a SmartLabel such as total, subtotal, or grandtotal in a cell, 1-2-3 checks to see if there are numbers in columns above and to the right, or in rows below and to the left.

To sum columns, you must enter total, subtotal, or grandtotal to the left of the range where you want to create the sums.

| 6 |  | Paris | Atlanta |
|---|---|---|---|
| 7 | June | 5500 | 3300 |
| 8 | July | 4500 | 5600 |
| 9 | August | 3200 | 2100 |
| 10 | Total | 13200 | 11000 |

Enter "Total" here to sum columns

To sum rows, enter total, subtotal, or grandtotal above the range where you want to create the sums.

Enter "Total" here to sum rows

| 15 |  | Paris | Atlanta | Total |
|---|---|---|---|---|
| 16 | June | 5500 | 3300 | 8800 |
| 17 | July | 4500 | 5600 | 10100 |
| 18 | August | 3200 | 2100 | 5300 |

FIG. 3B

MANIPULATING OF LABELLED DATA FOR DATA ENTRY IN MANAGEMENT APPLICATIONS

This application is a continuation application claiming priority to Ser. No. 10/803,660, filed Mar. 18, 2004, now U.S. Pat. No. 8,782,508, issued Jul. 15, 2014.

The present invention relates to the field of information processing by digital computers, and more particularly to a method and system to manipulate labelled fields in tables for data entry in data management application.

BACKGROUND OF THE INVENTION

Before computers, numerical analyses, particularly financial ones, were usually prepared on an accountant's columnar-pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a connex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using* Quattro Pro 2, Borland-OsbornelMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Electronic spreadsheet files have thus become today the tool of choice for manipulating data, most of the time numbers, and computing output information from input information which may occupy hundreds or thousands of row data records. The most classical and obvious example corresponds to a vertical table constituted by a plurality of horizontal records, and structured according to vertical fields. When a table is initialised within electronic spreadsheet files, the user has to specify for each table record the different fields belonging to the table. Some field are "input" fields which will receive row data, while other fields are "output" fields which will result from the input fields according to some formulas. The initialisation of input fields is most of the time difficult to automate as they are generally corresponding to different samples of a given variable. Nevertheless input field data are easy to specify as the user is just asked to type a value within the spreadsheet file. The initialisation of the output fields is less combersome as the same relationship (in fact a formula) is used across different records, so that the initialisation of a field within a given record can be copied onto the other records. Nevertheless as the data to be specified is a formula (instead of a row data), the complexity comes from the strict syntax to be followed when specifying formulas. The present invention proposes an original system and method for assisting the spreadsheet user to intialise the output fields of a table part of an electronic spreadsheet file. The proposed method outscore some conventional means already available in the field of electronic spreadsheets.

MS Excel

The Excel tool from Microsoft corporation includes means allowing a spreadsheet user to use a table label as the argument of a function. This feature is interesting in the sense that it relieves the spreadsheet user to master the way range of cells are addressed within an electronic spreadsheet. Nevertheless it presents the drawback of being only used as function arguments, requiring thus that the spreadsheet user do master the function call syntax. This feature is illustrated in the FIG. 3A showing some text extracted from the MS Excel on-line help.

Lotus 123

The 123 tool kit from Lotus Corporation defines the concept of SmartLabels. They allow user to associate a label with a function according to a predefined relationship. Facilities are made available within 123 to manage such relationships (for creating, editing, or cancelling them). This feature is interesting in the sense that it only asks the spreadsheet user to learn the SmartLabels (which are very intuitive, like the label "total" to sum the various elements of a given field) instead of the function syntax. Nevertheless it presents the drawback of only facilitating the specification of function, but without specifying arguments other than using the reserved word "list" to represent a range of cells. So the interest is limited to conventional functions like summing, or averaging a range. The FIG. 3B shows an extract of the on-line 123 help articulating the SmartLabel usage, whereas the FIG. 3C illustrates the corresponding SmartLabel Editor interface.

The limitations of the conventional tools introduced here above become quickly unbearable when an "average" spreadsheet user (or simply a spreadsheet beginner) wishes to quickly build tables without having to master the syntax of the formula language available within the electronic spreadsheet environment.

IBM ICU

The Interactive Chart Utility (ICU) is a module being part of the GDDM-PGF (5668-812) product from IBM, allows the user to draw charts on his screen and print them. This tool allows entry of data with columns and rows, the column values representing the X axis and the different Y axis values. Each Y axis column represents the Y axis values of one curve to be drawn. To facilitate the data entry, the columns automatically receive as a label, a simple variable name, X (for X axis column values), Y1, Y2, . . . Yn . . . For the different Y axis column values.

It is possible to use a combination of values from other columns to create a new column of Y axis value by entering the combination on a command line dedicated to each column.' The combination is limited to a basic operation such as multiplication, division, addition substraction, the operands being the column labels. The argument and operand are entered step by step.

It is possible also to modify the values in one existing column by entering a combination as described here above. It is possible to modify the value of an existing row by introducing on a command line of the corresponding row numerical step by step simple operations. It is not possible to use a combination of other row labels used as variables because the rows do not receive row labels. It is not possible also to create new rows as it is possible to do it with the columns.

There is a need to facilitate the data entry in tables for all the kind of data management applications described here above. It should be possible to create or modify rows or columns by combining numerical values or row or column values into a function using the row or column label names as variables.

SUMMARY OF THE INVENTION

It is an object of the present invention to provide a system and method for computing values of output columns in vertically arranged tables having input columns and output columns and allowing labelling of any column, by entering mathematical expressions of both numbers and/or variables, the input column labels being used as variables.

It is an object of the present invention to provide a system and method for computing values of output rows in horizontally arranged tables having input rows and output rows and allowing labelling of any row, by entering mathematical expressions of both numbers and/or variables, the input row labels being used as variables.

It is another object of the invention to have a unique data entry step and a good computing time.

These objects are reached by the use of a method for data entry into the content of cells belonging to an output field, said data being expressed as a mathematical expression of the cell contents of at least one input field in a data multi dimensional table used by a data management application, said table comprising cells arranged as a grid of records and fields, each cell corresponding to the intersection of one record with one field, each cell being identified by a cell address and comprising a cell content, said table having one specific record in which each cell content is entered as a unique character string label identifying each table field, said method comprising the steps of entering labels corresponding to the at least one input field and a label corresponding to the output field, said later label being expressed as the mathematical expression of said labels of said at least one input field; parsing the label of the output field into a mathematical expression by identifying the numeric operands, the operators and the at least one existing input field label; translating in the mathematical expression, the at least one existing input field label into the address of the cell containing the at least one input field label; and, for each cell of the output field, pasting in the cell content the translated mathematical expression and replacing in said pasted mathematical expression each cell address of the at least one input field label by the cell address of the at least input field belonging to the same record.

These objects are also reached, according to claim 2, by the use of the method of claim 1 further comprising the step of replacing the output field cell contents by the computed mathematical expression applied to the cell contents corresponding to the cell addresses of the at least input field belonging to the same record.

These objects are also reached, according to claim 3, by the use of the method of anyone of claims 1 to 2 further comprising the steps of repeating the preceding steps to compute the content of the cells of any additional output field in the table, wherein said content can be expressed as a mathematical expression of the cell contents of at least one input field.

These objects are also reached, according to claim 4, by the use of the method of anyone of claim 1 or 3 wherein the step of parsing the label includes a transformation of the cell content type from a character string into a computable mathematical expression.

These objects are also reached, according to claim 5, by the use of the method of anyone of claims 1 to 4 wherein the mathematical expression comprises complex operators developed as functions in the data management application.

These objects are also reached, according to claim 6, by the use of the method of anyone of claims 1 to 5 further comprising an initial step of selecting the input and output fields forming the data multidimensional table in a larger data multidimensional table.

These objects are also reached, according to claim 7, by the use of the method of anyone of claims 1 to 6 wherein after the step of entering labels, the following steps are executed only if a further step of starting computation of the cell contents of the output field is triggered.

These objects are also reached, according to claim 8, by the use of the method of anyone of claims 1 to 7 wherein the fields and records are respectively the columns and rows if the data multidimensional table is vertically arranged or are respectively the rows and columns if the data multidimensional table is horizontally arranged.

These objects are also reached, according to claim 9, by the use of the method of anyone of claims 1 to 8 wherein the specific record in the data multidimensional table is respectively the top record in a vertically arranged table and the first left record in a horizontally arranged table.

These objects are also reached, according to claim 10, by the use of a data processing system comprising means adapted for carrying out anyone of the steps of the method according to anyone of claims 1 to 9.

These objects are also reached, according to claim 11, by the use of a computer program product comprising programming code instructions for executing the steps of the method according to anyone of claims 1 to 9 when said program is executed on a computer.

To ensure automation and good response time, the user of method or the system of the invention will delimit in a table, the areas which will be dedicated to these specific manipulations of data. This will drastically limit the amount of computing resources to the minimum and thus will not jeopardize response time.

A huge advantage of the solution of the present invention is to provide a simple way of entering data: there is no need of knowing any programming language and syntax of the data management tool because the functions are expressed as intuitive expressions based on simple mathematical expressions which is a universal language.

Furthermore, with the solution of the invention, one can take advantage of the functions already provided with the data entry tool of the data management application or functions developed by the programmers and introduce them in the mathematical expressions for creating or modifying a row or a column. It is true that with 'old generation' tools such as ICU, not programmable, the set of functions is limited, but with 'new generation' tools such as data entry tools for spreadsheet programs, the set of function is unlimited.

The preferred embodiment described a labelled Table Field Manager which can be used in a spreadsheet program such as MS Excel or Lotus 123. This solution can be advantageously implemented in a graphical tool such as ICU or in any data entry module used in data management applications such as DB2.

The advantage of solution of the invention is that when the output column or row cell content contains the mathematical expression of the cell content addresses of the input fields, each time the input field cell contents change, the final computed value from the output column will be changed because each cell of the output row or column keeps a historical record of the way the values have been computed. When the data management application cannot support mathematical expressions in the cell content, at least the output column or row label stays in the form of the mathematical expression and thus, keep a historical record of the way the values have been computed.

Finally, it is noted also, that the use of the label names for computing output column or row values according to the solution of the invention can be known internally to this table (or part of table) on which the computation is done. By implementing the method as a specific module of the entire data management application, there is no interference with the other labels which are given and used during the execution of the other part of the entire data management application.

BRIEF DESCRIPTION OF THE DRAWINGS

FIG. 3A shows a text extracted from an on-line Help window illustrating how the MS Excel tool uses labels within tables.

FIG. 3B shows a text extracted from an on-line Help window illustrating how the Lotus 123 tool uses SmartLabels.

DETAILED DESCRIPTION OF THE PREFERRED EMBODIMENT

System Hardware

Figure 1A:
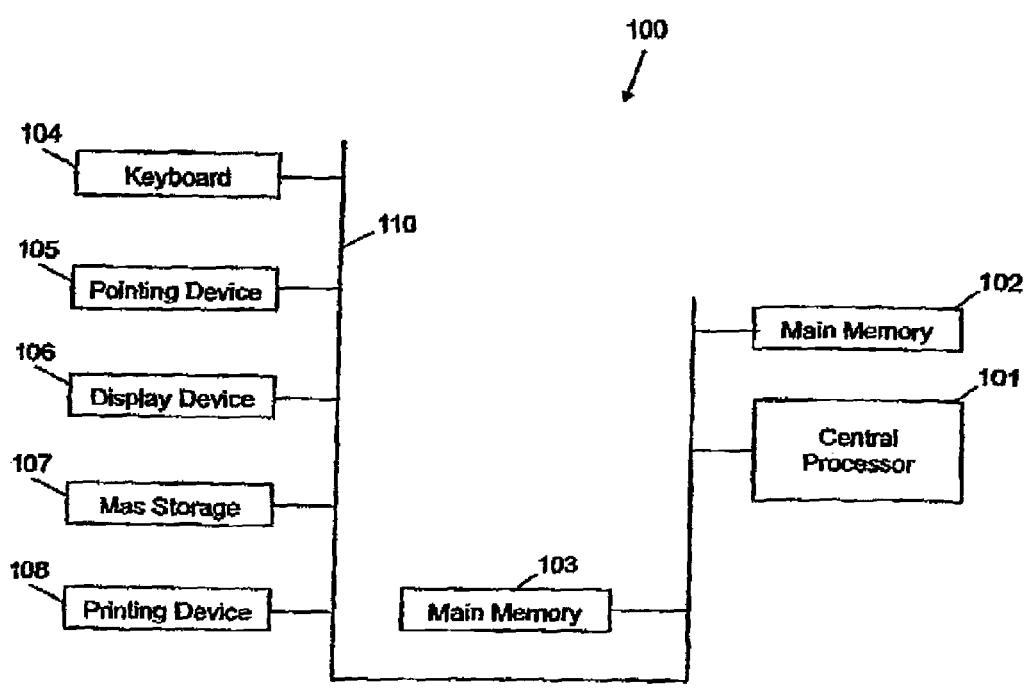
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 {e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
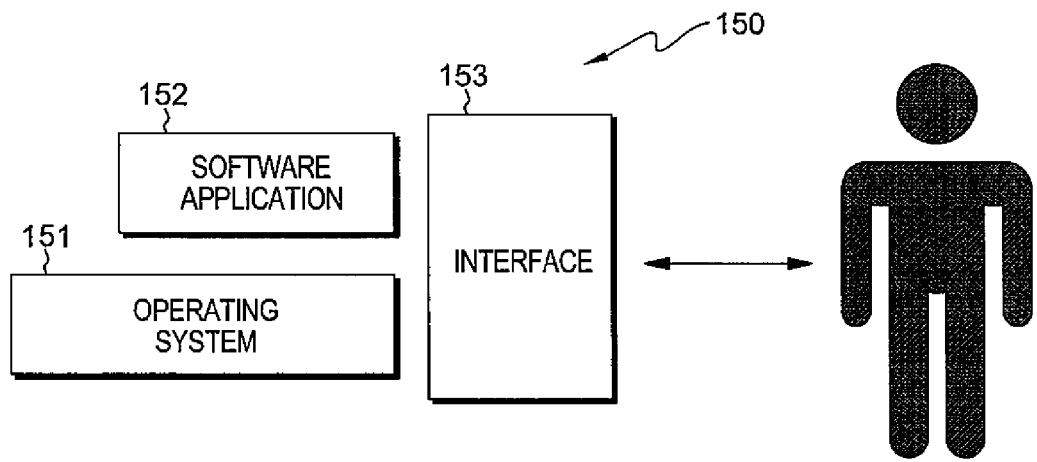
FIG. 1B is a block diagram of a software system including an operating system, an application software, and a user interface for carrying out the present invention.
Figure 3C:
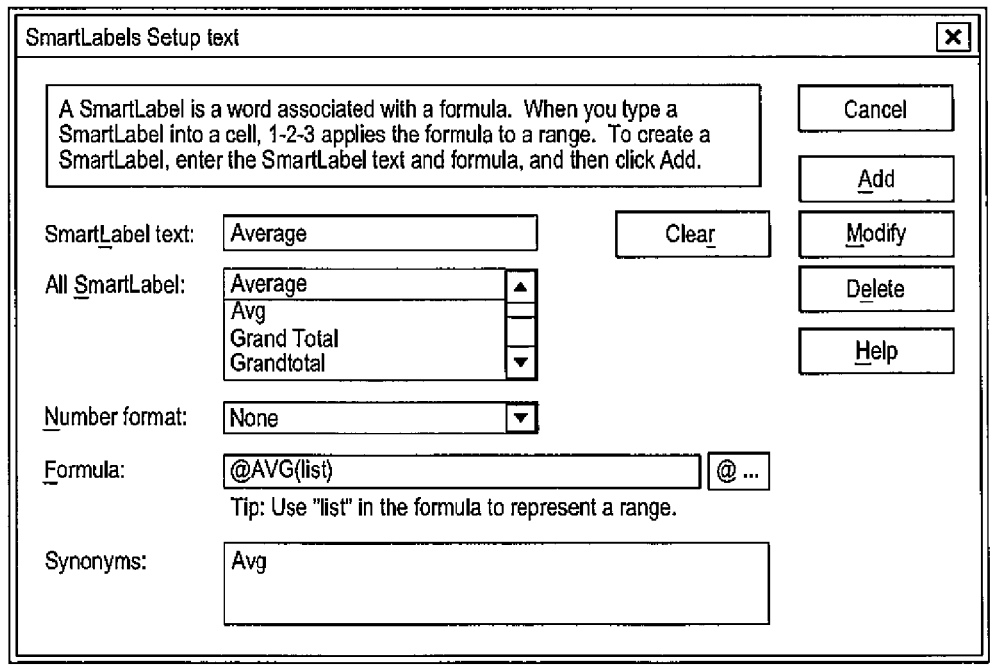
FIG. 3C shows the dialogue box part of the SmartLabel Editor interface available within the Lotus 123 tool.

Illustrated in FIG. 1B, a computer software system 150 is provided for directing the operation of the computer system 100.' Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
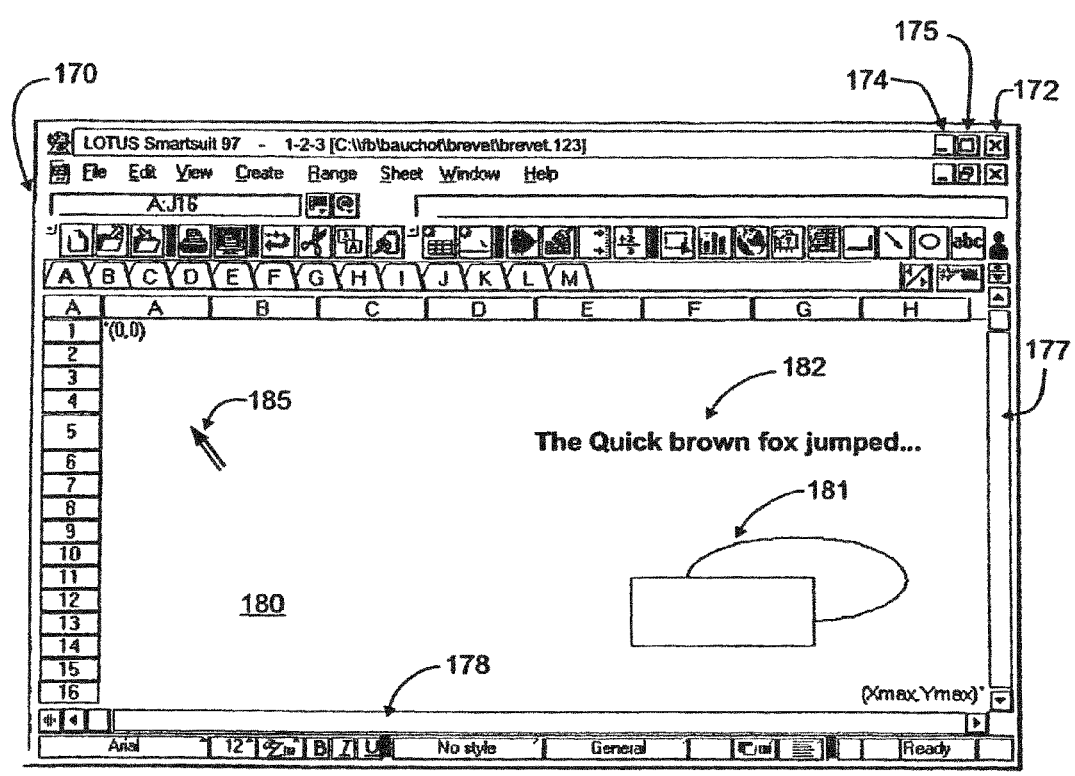
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats {i.e., freely moves) across the screen 106 to a desired screen location. During .or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
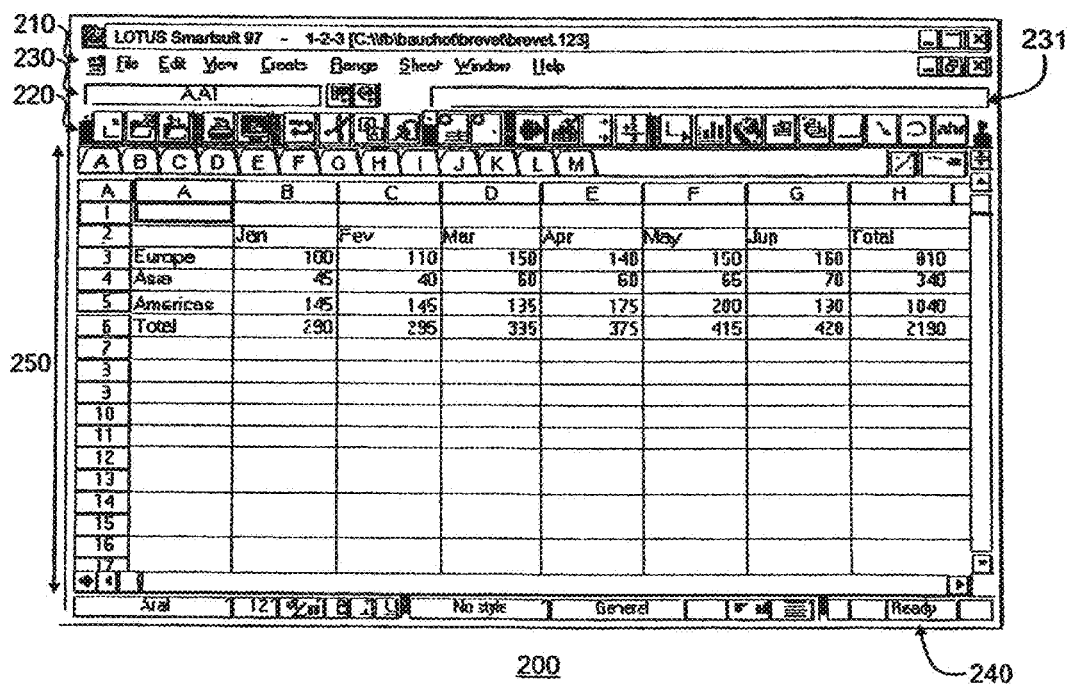
FIG. 2A shows a spreadsheet notebook interface according to the preferred embodiment of the present invention.
Figure 2B:
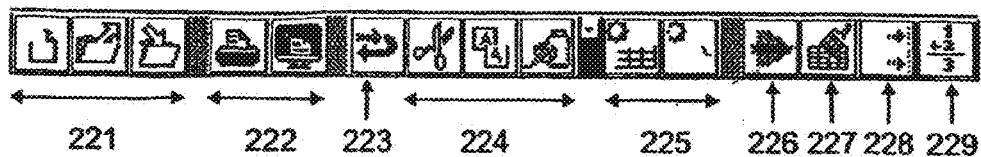
FIG. 2B shows the toolbar component of the notebook interface shown in FIG. 2A.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

The toolbar 220, shown in further detail in FIG. 28, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
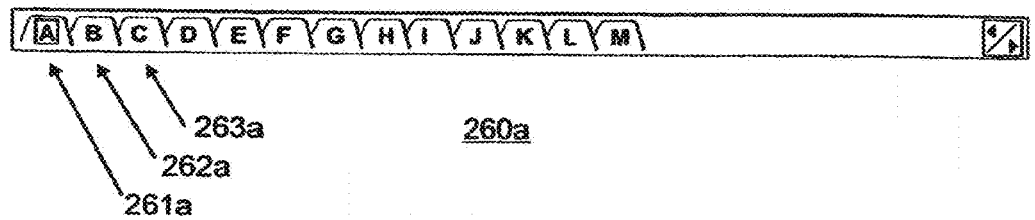
FIGS. 2C and 2D show page identifiers for rapidly accessing and manipulating individual pages of the notebook interface shown in FIG. 2A.
Figure 2D:
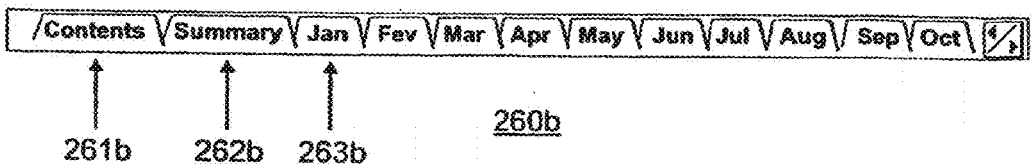

As shown in FIGS. 2C-D, individual notebook pages are identified by page identifiers' 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents' (tab member 261b), "Summary" (tab member 262b), and "Jan" (tab member a 263b). In similar manner, the remaining tabs are set to months of subsequent the year. In this manner, the user the page identifiers associates with familiar tabs from an ordinary paper notebook. Thus, the user already knows how to or select a page spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management of Fields within Labelled Tables

A. Introduction

As previously introduced in the invention summary section, the main inventive step of the present invention is to rely on the fields labels to:
1. Identify which fields are input fields and which fields are output fields
2. Identify the relationship between one output field and a plurality of input fields
3. Initialise the content of the cells belonging to an output field according to the identified relationship between this output field and a plurality of inputs fields.

Figure 3D:
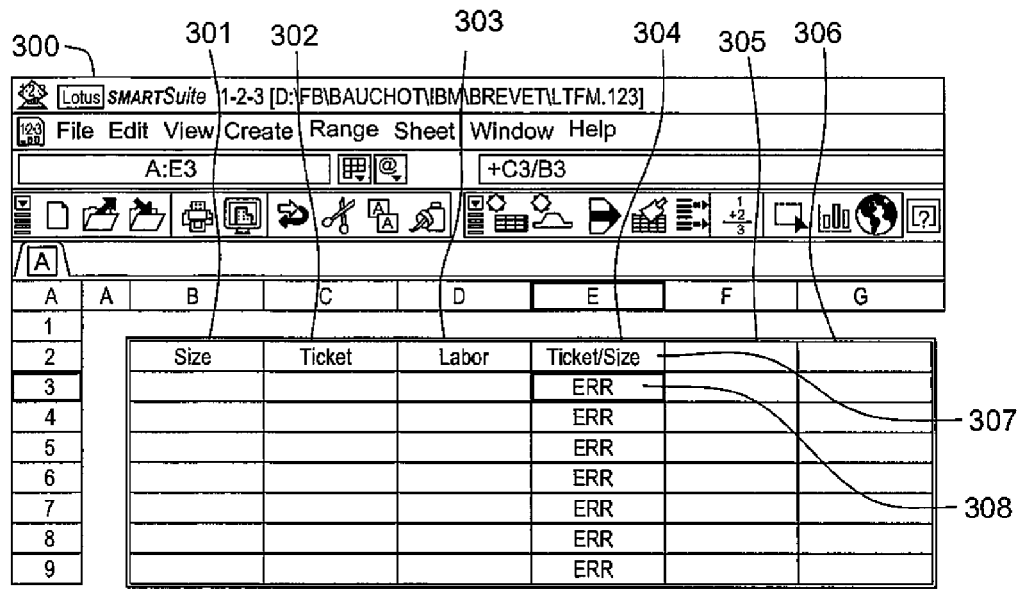
FIG. 3D shows an example of a labelled table when the first label has been specified.

The following example illustrates these concepts. A company XYZ is a network service provider wishing to benchmark its operations against the competition. For this purpose the company XYZ must evaluate some indicators measuring first the average number of network outages per network equipment, second the average number of network staff hours spent to handle a network outage, and third the average number of network staff hours per network equipment. To build such indicators, the company XYZ creates a table which is declared as a vertical Labelled Table. as illustrated in FIG. 3D, this labelled table 300 contains several records corresponding to reliability measurements for network equipment, each record corresponding to a customer network, and comprising 6 fields from the left to the right:
  "Size" is an input field 301 which quantifies the network size (number of equipment's)
  "Ticket" is an input field 302 which measures the number of network outages
  "Labor" is an input field 303 which measures the time spent for managing the customer network
  "Ticket/Size" is an output field 304 which evaluates the number of outage per network equipment
  "Labor/Ticket" is an output field 305 which evaluates the average time spent to handle a network outage
  "Labor/Size" is an output field 306 which evaluates the average time spent per managed network equipment.

The spreadsheet user starts filling the three leftmost labels "Size", "Ticket", and "Labor" at the top of the three respective fields 301, 302, and 303. Then as soon as the spreadsheet user has filled the fourth label "Ticket/Size" (within the cell 307 with address E2), at the top of the field 304, the Labelled Table Field Manager takes control and fills every cell belonging to this field with the relevant formula, as illustrated in FIG. 3D where the cell 308 with address E3 is initialised with the content "+C3/B3" as shown in the area 309 (the value taken by the cells of this field is equal to ERR as the "Size" field is not yet initialised and results into a division by zero).

Figure 3E:
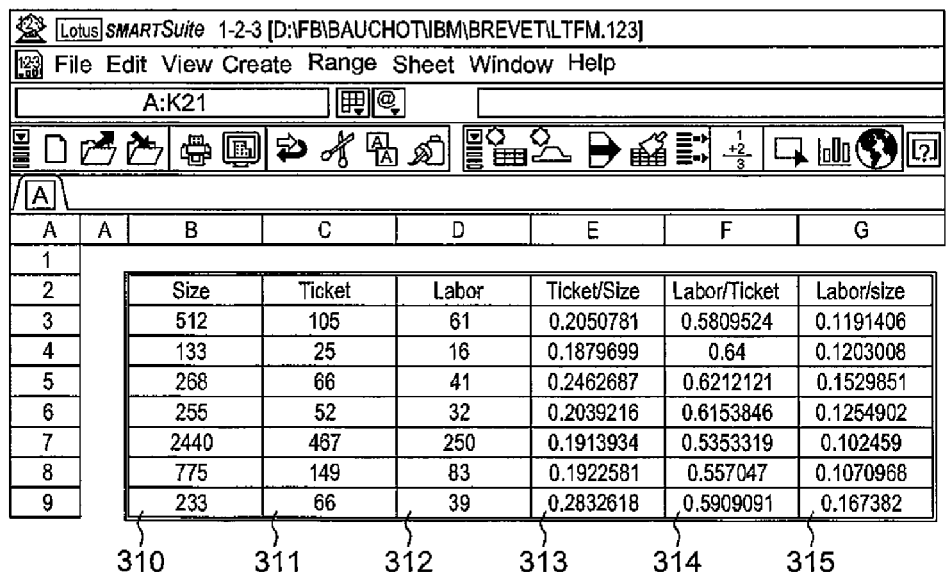
FIG. 3E shows an example of a labelled table when all the records have been specified.

Then the spreadsheet user fills the fifth field header with the label "Labor/Ticket" and the sixth field header with the label "Labor/Size". Similarly the Labelled Table Field Manager initialises every cell belonging to the two right most columns with a content of the form "D*/C*" in the fifth column, and "D*/B*" in the rightmost column. Eventually, as soon as the spreadsheet user will fill the input fields "Size", "Ticket" and "Labor" within each record of the table 300, the whole table will display the correct data, as shown in FIG. 3E. This is for instance illustrated in the bottom record where the cell 310 within the "Size" field 301 is filled with the value 233, where the cell 311 within the "Ticket" field 302 is filled with the value 66, and where the cell 312 within the "Labor" field 303 is filled with the value 39. These three input data result in the automatic generation, thanks to the Labelled Table Field Manager of the three output data, corresponding to the cells 313, 314, and 315, belonging respectively to the fields "Ticket/Size" 304, "Labor/Ticket" 305, and "Labor/Size" 306, and with the respective values 66/233 or 0.2832618, 39/66 or 0.5909091, and 39/233 or 0.167382.

B. Scenario

In contrast to just-described conventional tools, the present invention provides a more powerful, user-friendly and interactive approach for initialising the records within a so-called Labelled Table, by relying on the field headers, or Labels, of the Labelled Table.

Figure 4A:
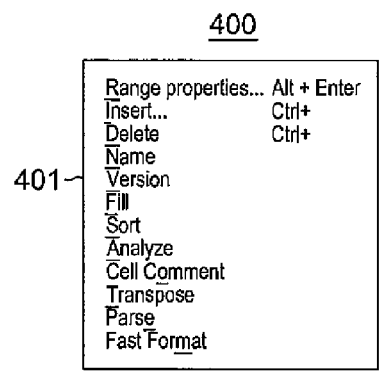
FIGS. 4A, 4B illustrate a preferred spreadsheet user interface for invoking the Labelled Table Field Manager operation, according to the present invention.
Figure 4B:
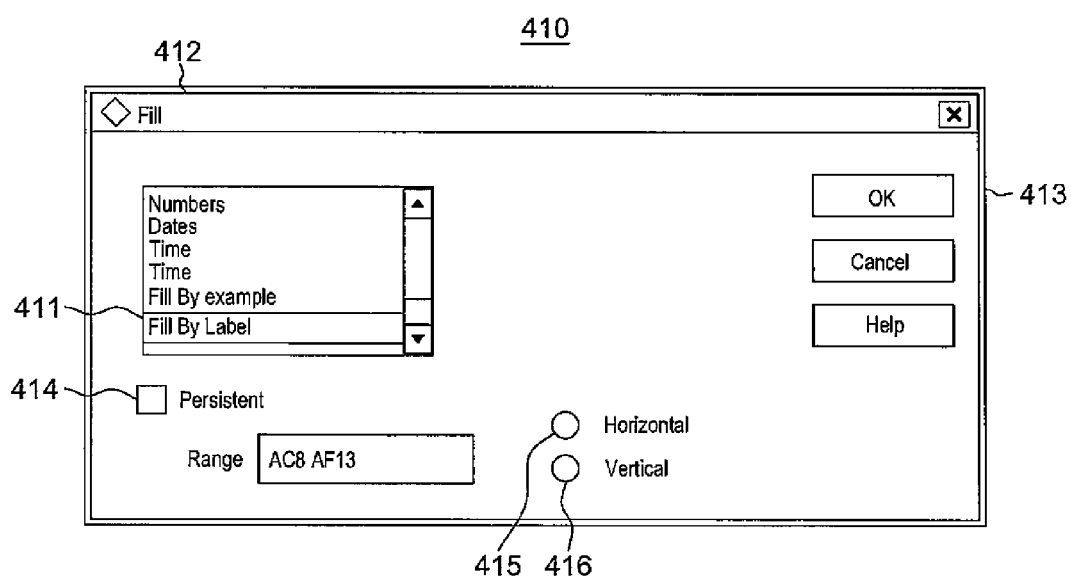

In a preferred embodiment, the present invention is used in two steps:
  1. The first step occurs when the spreadsheet user decides, based on some criteria not detailed here, to take advantage of the present invention by turning a given range of cells into a Labelled Table.
    First the spreadsheet user selects the relevant range of cells by using conventional means such as (but not limited to) the pointing device 105 or the keyboard 104.
    Then the spreadsheet user invokes an extension of the regular range fill operation thanks to conventional means available in spreadsheet environment, such as (but not limited to) dedicated push-buttons, keyboard entry short cuts, menu or sub menu entries. This extension of the regular range-till operation corresponds to a specific command called "Fill-by-label". In a preferred embodiment of the present invention, this Fill-by-label command is invoked by clicking with the pointing device 105 first on a menu entry 401 "Fill" within the conventional "Range" menu 400 of an electronic spreadsheet, as shown in FIG. 4A, then on a specific entry "Fill by label" 411 within a "Fill using" list box 412 present within a specific new dialog box "Fill" 410 as shown in FIG. 4B, then on one of the two option buttons "Horizontal" 415 or "Vertical" 416, and finally on the "OK" push-button 413 available within this same dialog box "Fill" 410. Optionally the spreadsheet user can click with the pointing device 105 on the "Persistent" check box 414 within the dialog box "Fill" 410 to specify that the formulas automatically generated by the present invention will have priority over field content specified by the spreadsheet user.
  2. The second step occurs when the spreadsheet user initialises the field headers, or labels, by filling their contents. Each time a label content is updated within a Labelled Table, a specific command "Labelled Table Field Manager" Command or "LTFM" command for short is invoked. This command parses each label within the Labelled Table to determine first which fields are input fields and which ones are output fields, and second the various relationships between a given output field and a plurality of input fields. Based on the determination of such relationships, each cell belonging both to an output field and to a table record is updated to automatically reflect the relevant relationship. If the "Persistent" check box 414 within the dialog box "Fill" 410 was not selected at the previous step, then this last cell content update is only performed on the cells which have not been filled by the spreadsheet user.

C. LTFM Table

The decision to turn a given range of cells into a Labelled Table belongs to the spreadsheet user. When this operation occurs, a common repository, called the "Labelled Table Field Manager" (LTFM Table for short), is used to record the data required by this operation. This LTFM Table is preferably saved on a non volatile memory (typically but not necessary as part of the spreadsheet disk file on the mass storage 107).

Figure 5:
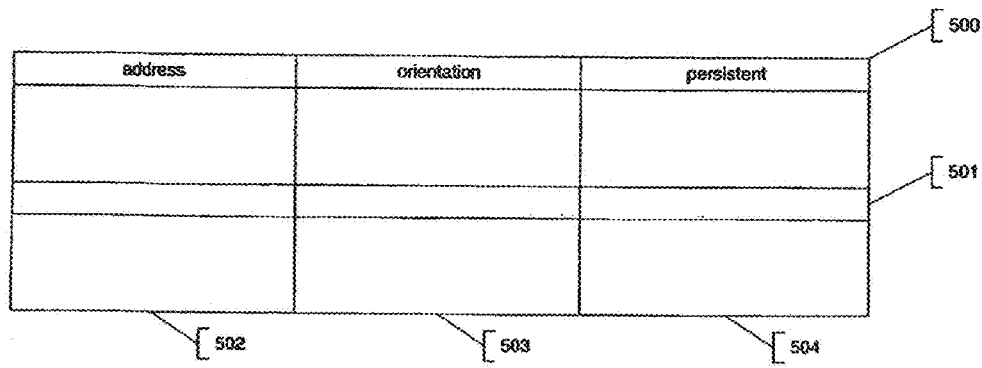
FIG. 5 shows the structure of the LTFM Table, used to record Labelled Table attributes.

Referring now to FIG. 5, the LTFM Table 500 corresponds to a logical simple structure made of several records 501, each of them associated to a Labelled Table, so that the LTFM Table 500 has as many rows as Labelled Tables are defined. Each record includes the following fields:

The "Address" field 502 is used for recording the address or the name of the range of cells turned into a Labelled Table. The "Orientation" field 503 is used for identifying if the Labelled Table is structured as a vertical or as an horizontal table. The values taken by this field are respectively set to VERTICAL and HORIZONTAL.

The "Persistent" field 504 is used for recording if the Labelled Table has been created while specifying that the formulas automatically generated by the present invention will have priority over field content specified by the spreadsheet user. If it is the case, then this field takes the value mu; otherwise it takes the value FALSE.

In the preferred embodiment, the LTFM Table 500 is explicitly included within the spreadsheet file itself, but other obvious implementations can 'be used instead.

D. Methods

D.1 Fill-by-label Method

Figure 6:
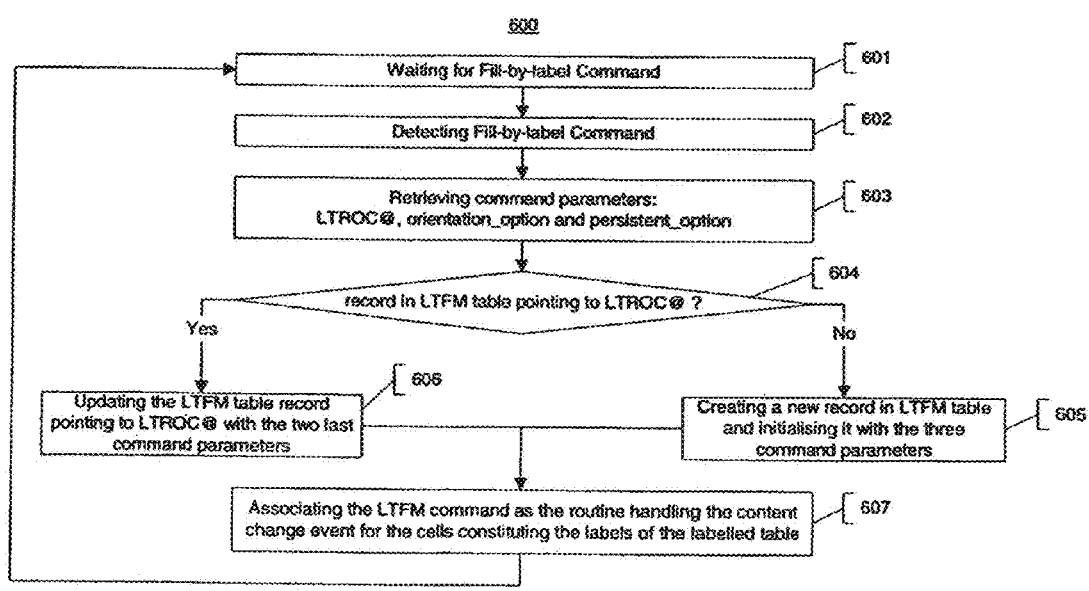
FIG. 6 is a flow chart illustrating a preferred method for handling treating the Fill-by-label command, according to the present invention.

The method for turning a given range of cells into a Labelled Table to take advantage of the present invention is summarised in flowchart 600 of FIG. 6. This method can be seen as the processing of the "Fill-by-label" command. The method comprises the following steps:

At step 601, the method is in its default state, waiting for an event to initiate the process.

At step 602, an event is detected, as a result of a user action. This action is typically the click by the pointing device 105 on the "OK" push-button 413 available within the dialog box "Fill" 410, but can also be for instance a specific combination of key on the keyboard 104, or any other similar means not further specified here.

At step 603, the address of the selected range of cells, the orientation (HORIZONTAL or VERTICAL) of the Labelled Table and the option specifying if the operation must or not be persistent, all considered as parameters of the Fill-by-label command, are retrieved under the respective names LTROO@, orientation_option and persistent_option. The LTROC® parameter corresponds to a valid range of cells address or name, the orientation_option parameter takes the value mrazorm, or VERTICAL, and the persistent_option parameter takes the value alum Or FALSE.

At step 604, the method checks if any record 501 of the LTFM 500 (PFBST) is already defined and associated to the Labelled Table with address LTROC@ in the address field 502. This may have already happened as part of a previous execution of the same Fill-by-label command. If such a record 501 is already associated to the same address LTROO$^g$, then control is given to step 606. Otherwise control is given to step 605.

At step 605, the method creates a new record 501 within the LTFM table 500 associated to the Labelled Table identified by its address LTROO. This new record 501 is initialized with the address field 502 filled with the parameter LTROC®, with the orientation field 503 filled with the orientation_option parameter, and with the persistent field 504 filled with the persistent_option parameter. Then control is given to step 607.

At step 606, the method updates the record 501 with the address field 502 pointing to the range of cells identified by its address LTROC@, by respectively filling the fields orientation 503 and persistent 504 with the parameters orientation option and persistent_option.

At step 607, the LTFM command is associated as being the routine handling the event corresponding to the content change of the cells constituting the labels of the Labelled Table with address LTROO®. This means that in the future, any change done on the content of a cell comprised within the labels of the Labelled Table with address LTROC@, will result in giving control to the LTFM command. Then control is given to the initial step 601 for handling any future invocation of the Fill-by-label command.

D.2. LTFM Method

Figure 7:
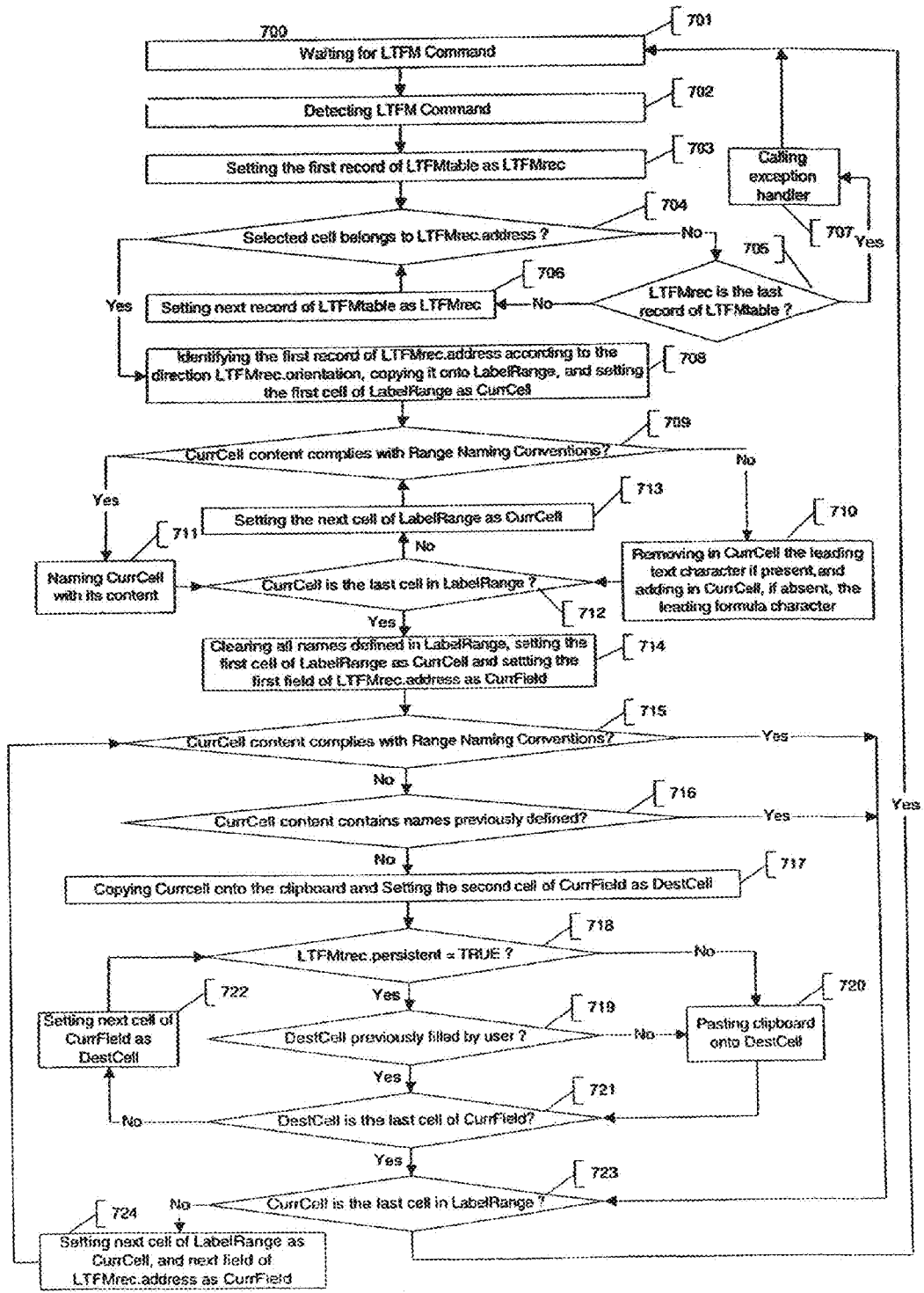
FIG. 7 is a flow chart illustrating a preferred method for handling the LTFM command, according to the present invention.

The method for automatically generating the formulas within the output fields of a Labelled Table to take advantage of the present invention is summarised in flowchart 700 of FIG. 7. This method can be seen as the processing of the "LTFM" command. The method comprises the following steps:

At step 701, the method is in its default state, waiting for an event to initiate the process.

At step 702, an event is detected, triggering the command execution to start. This event is typically the change of the content of any cell belonging to the set of labels defined within a Labelled Table.

At step 703, the first record 501 of the LTFM table 500 is set as the local variable LTFMrec.

At step 704, a test is performed to check if the currently selected cell (whose content change has triggered the initiation of the current process) belongs to the range of cell whose address is given by the address field 502 of the record LTFMrec 501 (for short this field 502 is noted LTFMrec. address). If it is the case, then control is given to step 708; otherwise control is given to step 706.

At step 705, a test is performed to check if the record LTFMrec 501 is the last record of the LTFM table 500. If it is the case, then control is given to step 707; otherwise control is given to step 706.

At step 706, the record following the LTFMrec record 501 within the LTFM table 500 becomes the new LTFMrec record 501. Then control is given to step 704.

At step 707, the conventional exception handling routine is called to treat the "should not occur" situation where none record 501 of the LTFM table 500 has been found. Then control is given to the initial step 701 for treating any future LTFM command.

At step 708, the first record of the range of cell with address LTFMrec.address is identified according to the direction LTFMrec.orientation. If this direction takes the value VERTICAL, then the first record corresponds to the top row; if this direction takes the value HORIZONTAL, then the first record corresponds to the leftmost column. In both cases, this first record is copied onto a working range of cells buffer named LabelRange. Finally the first cell of LabelRange is identified as being the local variable CurrCell (when the direction takes the value VERTICAL, then the first cell CurrCell corresponds to the leftmost cell of LabelRange; when the direction takes the value HORIZONTAL, then the first cell CurrCell corresponds to the top cell of LabelRange).

At step 709, a test is performed to check if the content of CurrCell complies with the Range Naming Conventions which are defined within the currrent spreadsheet environment (such conventions may be electronic spreadsheet environment dependent and will for instance slightly differ from a Microsoft Excel environment to a Lotus 123 environment). If it is the case, then control is given to step 711; otherwise control is given to step 710.

At step 710, the leading text character, if found present, is removed from the content of CurrCell (for instance for respectively left justified, centered, and right justified text, the leading text character is the apostrophe quote, the caret, and the quotation mark). Then the leading formula character, if found absent, is introduced at the beginning of the content of CurrCell (for instance this leading formula character is the plus sign "+" in the Lotus 123 environment while it is the equal sign u=ff in the Microsoft Excel environment). Then control is given to step 712.

At step 711, the cell CurrCell is named with a name equal to its content.

At step 712, a test is performed to check if CurrCell is the last cell in LabelRange (the rightmost cell when LTFMtec.orientation is equal to vmuloz, or the bottom cell when LTFMtec.orientation is equal to HORIZONTAL). If it is the case, then control is given to step 714; otherwise control is given to step 713.

At step 713, the next cell of LabelRange becomes the new cell CurrCell (the new CurrCell is on the right of the previous CurrCell when LTFMtec.orientation is equal to VERTICAL, and the new CurrCell is below the previous CurrCell when LTFMrec.orientation is equal to HORIZONTAL). Then control is given to step 709.

At step 714, all the names which were previously assigned to cells belonging to LabelRange (as done at step 711) are cleared. Then the first cell of LabelRange is identified as being the local variable CurrCell (when the direction takes the value vm rICAL, then the first cell CurrCell corresponds to the leftmost cell of LabelRange; when the direction takes the value HORIZONTAL, then the first cell CurrCell corresponds to the top cell of LabelRange).

At step 715, a test is performed to check if the content of CurrCell complies with the Range Naming Conventions which are defined within the currrent spreadsheet environment (such conventions may be electronic spreadsheet environment dependent and will for instance slightly differ from a Microsoft Excel environment to a Lotus 123 environment). If it is the case, then control is given to step 723; otherwise control is given to step 716.

At step 716, a test is performed to check if the content of CurrCell contains one or a plurality of names previously defined at step 711. If it is the case, then control is given to step 723; otherwise control is given to step 717.

At step 717, the content of CurrCell is copied on the clipboard. Then the second cell of CurrField is identified as being the local variable DestCell. At step 718, a test is performed to check if the persistent field 504 of the record LTFMtec 501 is found equal to mum. If it is the case, then control is given to step 719; otherwise control is given to step 720.

At step 719, a test is performed to determine if the content of CurrCell has been updated by the spreadsheet user, or if it has been left unchanged since any last update from the LFTM command (several conventional implementations can be used to perform this test, such as for instance keeping a reference of the last update done by the LTFM command and then comparing this reference with the current content of CurrCell). If it is the case, then control is given to step 721; otherwise control is given to step 720.

At step 720, the clipboard is copied onto the content of CurrCell.

At step 721, a test is performed to check if DestCell is the last cell of Currfield (when the direction takes the value VERTICAL, then the last cell DestCell corresponds to the bottom cell of CurrField; when the direction takes the value HORIZONTAL, then the last cell DestCell corresponds to the rightmost cell of CurrField). If it is the case, then control is given to step 723; otherwise control is given to step 722.

At step 722, the next cell of CurrField becomes the new DestCell (the new DestCell is below the previous DestCell when LTFMrec.orientation is equal to VERTICAL, and the new DestCell is on the right of the previous DestCell when LTFMrec.orientation is equal to mmuowm). Then control is given to step 718.

At step 723, a test is performed to check if CurrCell is the last cell in LabelRange (the rightmost cell when LTFMrec.orientation is equal to VERTICAL, or the bottom cell when LTFMrec.orientation is equal to HORIZONTAL). If it is the case, then control is given to the initial step 701 for treating any future LTFM command; otherwise control is given to step 724.

At step 724, the next cell of LabelRange becomes the new cell CurrCell (the new CurrCell is on the right of the previous CurrCell when LTFMrec.orientation is equal to VERTICAL, and the new CurrCell is below the previous CurrCell when LTFMrec.orientation is equal to walzomna), and the next field of the range of cells LTFMrec.address becomes the new field CurrField (the new CurrField is on the right of the previous CurrField when LTEMtec.orientation is equal to VERTICAL, and the new CurrField is below the previous CurrField when LTFMtec.orientation is equal to HORIZONTAL). Then control is given to step 715.

ALTERNATE EMBODIMENTS

While the invention has been particularly shown and described with reference to a preferred embodiment, it will be understood that various changes in form and detail may be made therein without departing from the scope of the invention.

1. Any temporary buffer may be use in place of the clipboard at steps 717 and 720 for copy-paste operation.
2. The methods and systems according to the present invention may be used advantageously in those environments where elements of information are organised as multidimensional tables having more than three dimensions.
3. The LFTM can be introduced as a data entry module for tables in any data management application.

What is claimed is:

1. A method for entry of data into cells belonging to an output field of a multidimensional table, said method comprising:
    entering, by a processor of a computer system, into cells of a multidimensional table located within a header record in the table: (i) at least one input field label respectively corresponding to at least one input field in the table such that each input field label is entered into a respective unique cell within the header record and (ii) an output label corresponding to the output field such that the output label is entered into a specifically unique cell within the header record, said output label being expressed as a mathematical expression of one or more labels of the at least one input field label, said output field consisting of a column that contains the specifically unique cell and other cells, said mathematical expression being a formula whose computed value is entered into the other cells of the column, said header row being a first record of the multidimensional table and precedes all other records of the multidimensional table;
    in response to the output label being entered, performing the following:
        said processor parsing the output label to identify each input field label;
        said processor translating the mathematical expression of the one or more labels such that each identified input field label is translated into the cell address of the cell containing each identified input field label; and
        said processor pasting in said each cell of the other cells, the translated mathematical expression and replacing in said pasted mathematical expression for each cell of the other cells, the cell address of the cell containing each input field label by the corresponding cell address of each input field in the same record as the record of said pasted mathematical expression that contains said each cell of the other cells.

2. The method of claim 1, wherein a totality of data content in the specifically unique cell within the header record consists of the output label, and wherein the output label consists of the mathematical expression of the one or more labels.

3. The method of claim 1, said method further comprising:
    after said pasting and replacing, said processor computing a value of the formula of the mathematical expression at each cell of the other cells, wherein said computing uses the value of each input field obtained at the replaced cell address of each input field in said each cell of the other cells.

4. The method of claim 1, said method further comprising:
    receiving a selection by a user of an option, from a menu presented to the user by the spreadsheet program, to begin said entering.

5. The method of claim 1, said method further comprising:
    said processor receiving a selection of a range of cells of the multidimensional table to which said entering, said parsing, said translating, and said pasting and translating are selectively applied and are not applied to additional cells of the multidimensional table which are outside of the range of cells, wherein the additional cells are configured to have data entered therein in accordance with field content specified by a user.

6. The method of claim 5, wherein the range a cells defines a labelled table within the multidimensional table, and wherein the method further comprises:
    said processor generating a labeled table field manager (LTMF) table, wherein the LTMF table comprises an address field, an orientation field, and a persistent field, wherein the address field records the range of cells, wherein the orientation field records a value indicating whether the labeled table has said vertical orientation or said horizontal orientation; and wherein the persistent field records a value indicating whether the replaced cell address of each input field in said each cell of the output field has priority over field information specified by the user for placement in said each cell of the output field.

7. The method of claim 6, wherein a totality of fields of the LTMF table consists of the address field, the orientation field, and the persistent field.

8. A computer program product, comprising a computer readable storage device not being a signal and having a computer readable program code stored therein, said program code configured to be executed by a processor of a computer system to implement a method for entry of data into cells belonging to an output field of a multidimensional table, said method comprising:
    entering, by said processor, into cells of a multidimensional table located within a header record in the table: (i) at least one input field label respectively corresponding to at least one input field in the table such that each input field label is entered into a respective unique cell within the header record and (ii) an output label corresponding to the output field such that the output label is entered into a specifically unique cell within the header record, said output label being expressed as a mathematical expression of one or more labels of the at least one input field label, said output field consisting of a column that contains the specifically unique cell and other cells, said mathematical expression being a formula whose computed value is entered into the other cells of the column, said header row being a first record of the multidimensional table and precedes all other records of the multidimensional table;
    in response to the output label being entered, performing the following:
        said processor parsing the output label to identify each input field label;
        said processor translating the mathematical expression of the one or more labels such that each identified input field label is translated into the cell address of the cell containing each identified input field label; and
        said processor pasting in said each cell of the other cells, the translated mathematical expression and replacing in said pasted mathematical expression for each cell of the other cells, the cell address of the cell containing each input field label by the corresponding cell address of each input field in the same record as the record of said pasted mathematical expression that contains said each cell of the other cells.

9. The computer program product of claim 8, wherein a totality of data content in the specifically unique cell within the header record consists of the output label, and wherein the output label consists of the mathematical expression of the one or more labels.

10. The computer program product of claim 8, said method further comprising:
after said pasting and replacing, said processor computing a value of the formula of the mathematical expression at each cell of the other cells, wherein said computing uses the value of each input field obtained at the replaced cell address of each input field in said each cell of the other cells.

11. The computer program product of claim 8, said method further comprising:
receiving a selection by a user of an option, from a menu presented to the user by the spreadsheet program, to begin said entering.

12. The computer program product of claim 8, said method further comprising:
said processor receiving a selection of a range of cells of the multidimensional table to which said entering, said parsing, said translating, and said pasting and translating are selectively applied and are not applied to additional cells of the multidimensional table which are outside of the range of cells, wherein the additional cells are configured to have data entered therein in accordance with field content specified by a user.

13. The computer program product of claim 12, wherein the range a cells defines a labelled table within the multidimensional table, and wherein the method further comprises:
said processor generating a labelled table field manager (LTMF) table, wherein the LTMF table comprises an address field, an orientation field, and a persistent field, wherein the address field records the range of cells, wherein the orientation field records a value indicating whether the labelled table has said vertical orientation or said horizontal orientation; and wherein the persistent field records a value indicating whether the replaced cell address of each input field in said each cell of the output field has priority over field information specified by the user for placement in said each cell of the output field.

14. The computer program product of claim 13, wherein a totality of fields of the LTMF table consists of the address field, the orientation field, and the persistent field.

15. A computer system comprising a processor, a memory coupled to the processor, and a computer readable storage device coupled to the processor, said storage device not being a signal and containing program code configured to be executed by the processor via the memory to implement a method for entry of data into cells belonging to an output field of a multidimensional table, said method comprising:
entering, by said processor, into cells of a multidimensional table located within a header record in the table:
(i) at least one input field label respectively corresponding to at least one input field in the table such that each input field label is entered into a respective unique cell within the header record and (ii) an output label corresponding to the output field such that the output label is entered into a specifically unique cell within the header record, said output label being expressed as a mathematical expression of one or more labels of the at least one input field label, said output field consisting of a column that contains the specifically unique cell and other cells, said mathematical expression being a formula whose computed value is entered into the other cells of the column, said header row being a first record of the multidimensional table and precedes all other records of the multidimensional table;
in response to the output label being entered, performing the following:
said processor parsing the output label to identify each input field label;
said processor translating the mathematical expression of the one or more labels such that each identified input field label is translated into the cell address of the cell containing each identified input field label; and
said processor pasting in said each cell of the other cells, the translated mathematical expression and replacing in said pasted mathematical expression for each cell of the other cells, the cell address of the cell containing each input field label by the corresponding cell address of each input field in the same record as the record of said pasted mathematical expression that contains said each cell of the other cells.

16. The computer system of claim 15, wherein a totality of data content in the specifically unique cell within the header record consists of the output label, and wherein the output label consists of the mathematical expression of the one or more labels.

17. The computer system of claim 15, said method further comprising:
after said pasting and replacing, said processor computing a value of the formula of the mathematical expression at each cell of the other cells, wherein said computing uses the value of each input field obtained at the replaced cell address of each input field in said each cell of the other cells.

18. The computer system of claim 15, said method further comprising:
receiving a selection by a user of an option, from a menu presented to the user by the spreadsheet program, to begin said entering.

19. The computer system of claim 15, said method further comprising:
said processor receiving a selection of a range of cells of the multidimensional table to which said entering, said parsing, said translating, and said pasting and translating are selectively applied and are not applied to additional cells of the multidimensional table which are outside of the range of cells, wherein the additional cells are configured to have data entered therein in accordance with field content specified by a user.

20. The computer system of claim 19, wherein the range a cells defines a labelled table within the multidimensional table, and wherein the method further comprises:
said processor generating a labelled table field manager (LTMF) table, wherein the LTMF table comprises an address field, an orientation field, and a persistent field, wherein the address field records the range of cells, wherein the orientation field records a value indicating whether the labelled table has said vertical orientation or said horizontal orientation; and wherein the persistent field records a value indicating whether the replaced cell address of each input field in said each cell of the output field has priority over field information specified by the user for placement in said each cell of the output field.

* * * * *